US007031703B1

(12) United States Patent
Graf et al.

(10) Patent No.: US 7,031,703 B1
(45) Date of Patent: Apr. 18, 2006

(54) SYSTEM AND METHOD OF COMMUNICATING OPERATING CAPABILITIES IN A TELECOMMUNICATION NETWORK

(75) Inventors: Leslie Gary Graf, Balwyn (AU); Christian Norman Groves, Keilor (AU); Mark Alan Hollis, Park Orchards (AU); Juan Noguera-Rodriguez, Essendon (AU); Stephen Christopher Terrill, Stockholm (SE); Ian Rytina, Carlton (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 572 days.

(21) Appl. No.: 09/621,032

(22) Filed: Jul. 21, 2000

(30) Foreign Application Priority Data

Jul. 22, 1999 (AU) .................................. PQ1783
Jul. 30, 1999 (AU) .................................. PQ1942

(51) Int. Cl.
*H04Q 7/20* (2006.01)
(52) U.S. Cl. ............... 455/432.1; 455/433; 455/435.1; 455/445; 455/552.1; 455/560
(58) Field of Classification Search ............ 455/432, 455/433, 435, 445, 450, 453, 455, 456, 403, 455/550, 552, 553, 560, 561, 432.1, 435.1, 455/452.1, 456.1, 456.2, 552.1, 553.1
See application file for complete search history.

(56) References Cited

U.S. PATENT DOCUMENTS

| 5,715,522 | A | * | 2/1998 | Vimpari et al. ............... 455/88 |
| 5,761,623 | A | | 6/1998 | Lupien et al. ............... 455/552 |
| 5,924,026 | A | | 7/1999 | Krishnan ..................... 455/414 |
| 6,108,537 | A | * | 8/2000 | Comer et al. ............... 455/426 |
| 6,134,438 | A | * | 10/2000 | Sawyer ....................... 455/433 |
| 6,311,056 | B1 | * | 10/2001 | Sandidge ..................... 455/414 |
| 6,321,079 | B1 | * | 11/2001 | Cooper ........................ 455/411 |
| 6,363,144 | B1 | * | 3/2002 | Becher et al. ......... 379/211.01 |
| 6,374,103 | B1 | * | 4/2002 | Kamel et al. ............... 455/426 |
| 6,381,461 | B1 | * | 4/2002 | Besson et al. ............. 455/450 |
| 6,456,843 | B1 | * | 9/2002 | Daly .......................... 455/419 |
| 6,498,788 | B1 | * | 12/2002 | Emilsson et al. .......... 370/342 |
| 6,522,655 | B1 | * | 2/2003 | Laiho ......................... 370/410 |
| 6,535,736 | B1 | * | 3/2003 | Balogh et al. ............. 455/434 |
| 6,678,527 | B1 | * | 1/2004 | Rasanen ..................... 455/450 |

FOREIGN PATENT DOCUMENTS

EP          0 923 269 A2    6/1999
GB          2 300 334       10/1996

(Continued)

*Primary Examiner*—Edan Orgad

(57) ABSTRACT

The present invention relates to a system and method of communicating operating capabilities in a telecommunication network or networks. The present invention stems from the realisation that mobile telecommunication network resources can be utilised with greater efficiency by maintaining mobile station attributes or operating capabilities at a network node associated with the mobile station. Preferably, the network node is a Visitor Location Register VLR. Additionally, the network node may be a Home Location Register HLR, a Mobile Switching Centre MSC or a Gateway Mobile Switching Centre GMSC. In particular, the invention may provide the creation of a list of operating capabilities at a network node upstream from the mobile station. Having done this, a comparison of this list with another list received from a remote telecommunication element to negotiate operating capabilities at a call set up is achieved without involving communication resources between the mobile station and the network node.

17 Claims, 4 Drawing Sheets

FOREIGN PATENT DOCUMENTS

| | | |
|---|---|---|
| WO | WO 99/33300 A1 | 7/1999 |
| GB | 2 322 521 | 8/1998 |
| JP | 09-098396 * | 4/1998 |
| WO | WO 97/48243 A2 | 12/1997 |

* cited by examiner

SYSTEM AND METHOD OF COMMUNICATING OPERATING CAPABILITIES IN A TELECOMMUNICATION NETWORK

FIELD OF INVENTION

In general, the present invention relates to a system and method of communicating operating capabilities in a telecommunication network or networks.

In one aspect, the present invention relates to a method of negotiating operating capabilities between telecommunication subscribers, and more particularly relates to a method of enabling codec compatibility between a first mobile station in a public land mobile network (PLMN) and a network node either located in a fixed network or in a different PLMN or in the same PLMN, although, it is to be appreciated, however, that the invention is not limited to use in that application, only.

In another aspect, this invention relates to a method of providing operating capabilities at a telecommunications network node, and more particularly relates to a method of providing operating capabilities at a telecommunications network node during a call set-up procedure between a mobile station in a mobile telecommunications network and a network element.

BACKGROUND OF INVENTION

In general, when a subscriber having a mobile station (MS) or terminal located within a first PLMN wishes to contact another subscriber having a mobile station or terminal located in a different PLMN, the first mentioned subscriber's MS must transmit to its serving mobile switching centre (MSC) operating capabilities, such as, a codec or a list of codecs on which it can transmit information or messages. Negotiation must then be initiated, typically, over a fixed switched network, such as PSTN, or ISDN, IP or ATM with the other mobile station or terminal. Once operating capabilities are negotiated between the two mobile stations then the call may proceed using those capabilities. All of this negotiation requires a lot of signalling to take part between the originating mobile station and its serving MSC each time a call needs to be established.

As mobile networks are becoming more and more advanced and requiring the transmission of greater amounts of data between nodes of the network or across other networks such as a PSTN or ISDN fixed network, this creates a burdensome task for nodes within the network to process all the data. Furthermore, the signalling process takes place relatively slowly. It would therefore be desirable to remove extra data, where possible, especially between an MS and its serving MSC, in order to increase the speed of signalling and reduce the signalling load between the MS and MSC, especially for example, at call set-up. By reducing the amount of signalling data that needs to be transmitted between an originating mobile station and its serving MSC, the network resources could be more efficiently used.

In one particular arrangement, developed by the present applicant, a Bearer Independent Call Control (BICC) protocol is used for negotiating operating capabilities, and in particular codec negotiation. The BICC protocol is particularly suitable for third generation mobile networks, such as UMTS, wherein non-TDM transport technologies are used. However, the proposed BICC codec negotiation is not fully optimised for mobile environments. In particular, it is not optimised for fast selection of operating capabilities for mobile terminated calls when, for efficiency reasons, transcoders are placed in the edge of the core network at the GMSC.

The present invention seeks to overcome or substantially ameliorate at least one of the disadvantages of the prior art.

SUMMARY OF INVENTION

In one aspect the present invention provides a method of communicating in a telecommunication system including at least one mobile station, the method including the step of providing operating capabilities of the mobile station at a node associated with the mobile station wherein the node is upstream in a communication path from the mobile station.

In another aspect the present invention provides a telecommunication system including at least one mobile station and at least one node associated with the mobile station, the node including storage means for providing operating capabilities of the mobile station wherein the node is upstream in a communication path from the mobile station.

In essence, the present invention stems from the realisation that mobile telecommunication network resources can be utilised with greater efficiency by maintaining mobile station attributes or operating capabilities at a network node associated with the mobile station. Preferably, the network node is a Visitor Location Register VLR. Additionally, the network node may be a Home Location Register HLR, a Mobile Switching Centre MSC or a Gateway Mobile Switching Centre GMSC. In particular, the invention may provide the creation of a list of operating capabilities at a network node upstream from the mobile station. Having done this, a comparison of this list with another list received from a remote telecommunication element to negotiate operating capabilities at a call set up is achieved without involving communication resources between the mobile station and the network node.

In a further aspect, the present invention seeks to overcome or substantially ameliorate any of the abovementioned disadvantages by providing a method of negotiating operating capabilities between a mobile station and a network node whereby the amount of signalling required between the originating mobile station and its serving MSC is reduced.

Accordingly, in this aspect, the present invention provides a method of negotiating operating capabilities between a mobile station in a mobile telecommunications network and a network node, wherein said mobile telecommunications network includes a storage means associated with a switching centre serving said mobile station;

the method including the step of:

transmitting a list of one or more operating capabilities from said mobile station to the switching centre for storage in said storage means as part of a non-call based signal.

The method may further include the step of updating said storage means with another list of operating capabilities, such as codecs, for use by said mobile station when said mobile station moves from one location area to another location area by sending a message to said switching centre for subsequent storage in the storage means. The message may be a location update message or any existing or new message.

The network node may be located in a fixed network, such as PSTN or ISDN or in a mobile network, or it may be a mobile station located in another mobile telecommunications network.

The one or more operating capabilities may be prioritised such that a list of preferred operating capabilities is supplied by the mobile station. Operating capabilities may include security algorithms, or codecs, in which case the storage means will receive the list of algorithms supported by the MS for subsequent storage.

Thus, the signalling load is reduced between the MS and MSC at call set-up as the operating capabilities of the MS are already stored in the storage means associated with the switching centre and the MS does not need to transmit the operating capabilities each time it needs to establish a call. Furthermore, the MS does not need to receive the list of operating capabilities in the set-up message from the switching centre every time it receives a call.

In yet another aspect, the present invention seeks to overcome or substantially ameliorate any of the abovementioned disadvantages by providing a method of making available the list of operating capabilities to be used between a mobile station and a network node during a call set-up procedure between the mobile station and the network node. Accordingly, in this aspect, the present invention provides a method of providing operating capabilities of a mobile station at a telecommunications network node to a telecommunications element during a call set-up procedure between the mobile station and said telecommunications element, and wherein said telecommunications element transmits to the telecommunications network node a list of operating capabilities of the telecommunications element as part of the call set-up procedure, the method including the steps of:

transmitting a list of operating capabilities of said mobile station from a switching centre serving said mobile station to said telecommunication network node;

providing said list of operating capabilities at said telecommunications network node;

such that on initiation of a communication from said network element to said mobile station, said telecommunications network node internally selects one or more operating capabilities common to both the mobile station and the network element.

In this manner, the invention advantageously accelerates the selection of operating capabilities for mobile terminated calls wherein negotiation on the operating capabilities to be used between the mobile station and network node is no longer required at call set-up.

The network element is preferably another mobile station, but may alternatively be a telecommunications terminal device or node. The list of operating capabilities of the mobile station may be transmitted to the network node in response to an information retrieval message sent from the network node to the switching centre. The list of operating capabilities of said mobile station may have been previously stored in a storage means, such as a VLR, associated with the switching centre serving the mobile station. The telecommunications network node may be a node located in the same telecommunications network or PLMN as the mobile station. The telecommunications network node may be a node located in a fixed network which is traversed in establishing a call between the network element and the mobile station. Alternatively the telecommunications network node may be a node of a different network to that where the mobile station is located and is preferably at the home network of the mobile station. The node, when located in one of the PLMNs is preferably a GMSC. The list of operating capabilities of both the network element and the mobile station may be prioritised in the sense that preferred operating capabilities, such as codecs, are specified.

A list of operating capabilities of the network element may be stored at a network node serving the network of said network element. Preferably during the call set up the list of operating capabilities of the network element is transmitted from the network node serving the network of the network element to the telecommunications network node.

Thus, the selection of operating capabilities to be used is accelerated between the mobile station and the network element by the prior storage of the list of operating capabilities in the telecommunications network node. Codec operating capability negotiation need not take place as part of the call set-up between the mobile station and network element as the particular operating capabilities, such as codecs to be used, can be automatically selected by the telecommunications network node.

DESCRIPTION OF PREFERRED EMBODIMENTS

A preferred embodiment of the invention will be hereinafter described, by way of example only, with reference to the drawings wherein.

In general the present invention provides operating capabilities of a mobile station at a network node capable of storing the operating capabilities and thereafter negotiation of operating capabilities can proceed with a remote telecommunication element where negotiation does not need to take place between the mobile station and the node, which is upstream of the mobile station. When negotiating operating capabilities, a stored list is compared with the operating capabilities of the remote element, which can also be provided prior to a call set up and stored at a node upstream from the remote element. Preferably in the negotiation of operating capabilities, a selection is made based on operating capabilities common to both lists of operating capabilities stored at each node. Preferably, the remote telecommunication element is another mobile station, a terminal device or a node.

First Embodiment

Figure 1:
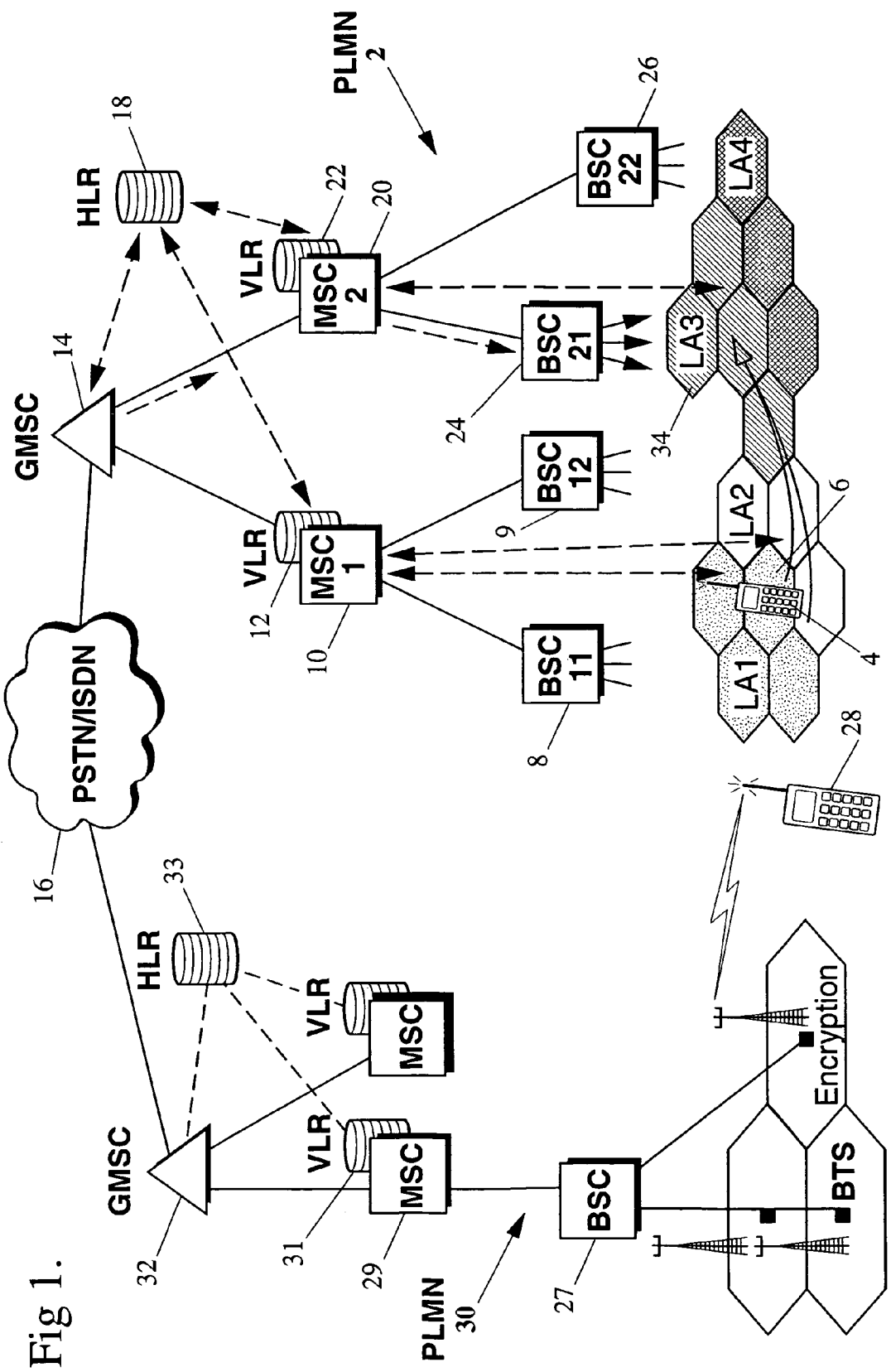
FIG. 1 is a schematic diagram of a telecommunication system used in accordance with the present invention.

In FIG. 1 there is shown a first mobile station MS 4 in a location area 6 (LA1), of a first PLMN 2, which is controlled by base station controller 8. The mobile switching centre 10 is in communication with each of the BSC 8 and a further BSC 9. The MSC 10 has an associated storage means in the form of a visitor location register (VLR) 12 in which is stored details of mobile subscribers and their mobile units that are temporarily located within its serving area, in this case LA1 and LA2. A gateway MSC (GMSC) 14 provides an interface between other networks such as a PSTN or ISDN 16. A further storage means 18 in the form of a home location register (HLR) provides permanent storage of subscriber details and keeps continuous track of the location of a subscriber whether that subscriber is in a MSC service area or in a different PLMN. This information is used by the GMSC 14 when receiving a call from another network. The PLMN 2 also has other MSCs such as MSC 20 with its own VLR 22 and whereby the MSC 20 serves BSCs 24 and 26.

When MS 4 wishes to contact a further mobile station 28 located in another PLMN 30 a set-up message will be transmitted from MS 4 to its serving MSC 10. Thereafter negotiation of operating capabilities, such as codecs or security algorithms, takes place between the MSC 10 and the PLMN 30 and in particular an MSC 29 that is serving between MS 28. An initial address message (IAM) is used to signal between the MSC 10 and MSC 29 of PLMN 30. The negotiation continues to take place and when an operating capability has been agreed upon between the MS 28 and MS 4 to transmit the data, then such data can be transmitted.

The MSC 10 or equivalently a Bearer Independent Call Control (BICC) node has the capability to separate the ISUP signal into a Call Control (CC) portion and a Bearer Control (BC) portion where the call control portion of ISUP carries the initial address message (IAM).

According to the present invention MS 4 regularly transmits to its serving MSC 10, via a message, such as a location update message or any other existing or new message, a list of operating capabilities applicable to MS 4 which is subsequently stored in the VLR 12 associated with that MSC. The list of operating capabilities may be updated at predetermined times for example on polling by the serving MSC 10 or when the mobile station 4 for example changes its location area say from LA1 to LA2. Alternatively a special procedure may be set up between the MS 4 and the MSC 10/LVR 12 to update the capabilities. The updated list of operating capabilities is then subsequently stored in the VLR 12 associated with MSC 10. By doing this, negotiation is handled between the MSC 10 and the MSC 29 as to which is a compatible operating capability on which both mobile stations 28 and 4 can communicate. The controlling MSCs of MS 4 and MS 28 know the operating capability options that each MS can support and the MSCs handle the negotiation on behalf of the MSs. Equivalently, the MS 28 has a list of operating capabilities stored in VLR 31 which it can use. In so doing, this creates less signalling at call set-up for example between the MS 4 and the MSC 10 and between the MS 28 and MSC 29. In practice when a MS 4 requires to initiate a call the MSC 10 will automatically select an operating capability from the list of operating capabilities stored in the VLR 12 and then the subsequent negotiation takes place between the MSC 10 and the MSC 29. The updated list of operating capabilities may be in order of priority so that if the most preferred operating capability cannot be negotiated then the next most preferred operating capability is attempted for compatibility.

The IAM originating from the serving MSC 10 of MS 4, includes the list of operating capabilities that the originating MS 4 prefers to use and once an operating capability is agreed by the BICC node 29 serving the receiving or destination MS 28, then the receiving MS 28 will answer by node 29 confirming a selected operating capability to use.

If the MS 4 crosses over into a further location area LA3 then the VLR 22 associated with the MSC 20 which oversees BSC 24 which in turn oversees LA3 will be updated with the new temporary records of MS 4 as well as HLR 18. Consequently any negotiation that is to take place on initiation from a call from a mobile station 4 while it is in the location area LA3 is done through the VLR 22 and the VLR 31 of the terminating subscriber as the new VLR 22 will have the updated list of operating capabilities.

Figure 2:
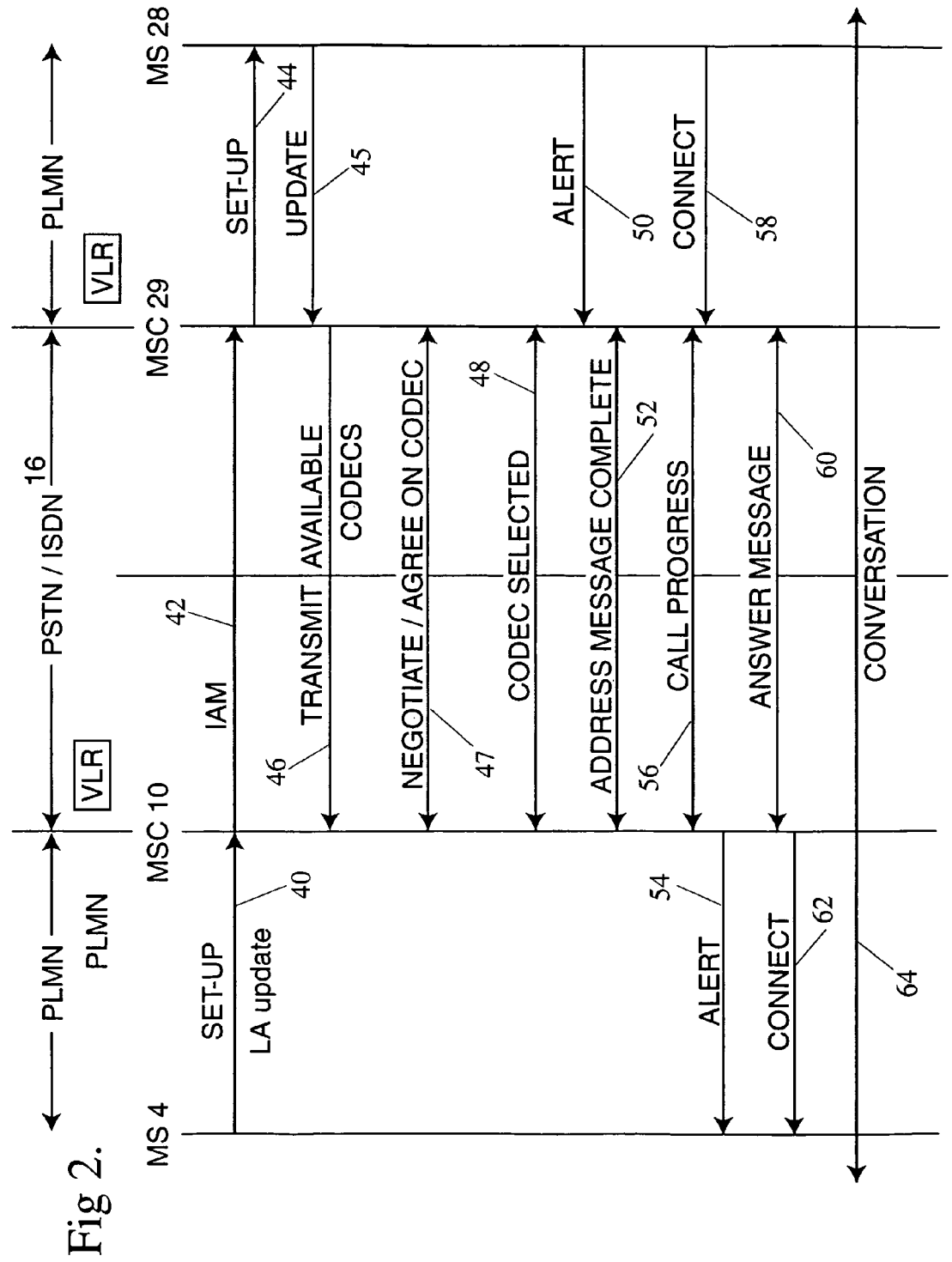
FIG. 2 is a signalling diagram showing the signalling messages that are conducted between two mobile stations in the telecommunications system of FIG. 1 in accordance with a first embodiment of the present invention.

An example of signalling that takes place between mobile stations during call set-up is shown in FIG. 2. MS 4 in PLMN 2 initiates a call set-up message at 40. This is received at the serving MSC 10 wherein an Initial Address Message (IAM) is transmitted by way of example over the core network 16 to the MSC 29 serving the terminating subscriber's MS 28. Signalling of the IAM is shown at 42. The IAM contains a list of operating capabilities, which may be prioritised, on which the MS 4 can transmit. The set-up message 44 is used for signalling between the MSC 29 of the terminating subscriber and MS 28. MS 28 then, through its serving MSC 29, responds by MSC 29 negotiating or providing a list of operating capabilities on which MS 28 can transmit to the MSC 10 at step 46. An update may be transmitted at various times or instances from MS 28 to VLR 31 at 45. Negotiation then takes place at 47 between the MSC 10 and the MSC 29. Once agreement is reached on which operating capability is to be used between the mobile stations 4 and 28, at 48, a ringing signal is initiated and an alert message is sent at 50 and then the MSC 29 serving MS 28 sends an address complete message at 52 to the MSC 10. The MSC 29 also sends a call progress message at 56 in response to receiving the alert message. On receipt of this message, an ALERT message is sent at 54 to MS 4 which responds by generating a ringing tone.

If the subscriber of MS 28 answers, that terminal sends a connect message at 58 which in turn is acknowledged by its serving MSC which forwards on an answer message at 60 to the MSC 10 which in turn sends a connect message 62 to MS 4. Conversation can then take place between the two mobile subscribers at 64.

It is to be understood that, although this embodiment has been described in relation to a GSM network, the invention equally applies to third generation PLMN networks and other second generation PLMNs including PDC, D-AMPS, UMTS, CDMAOne and CDMA2000, having similar architectures. In the 3G networks negotiations with respect to operating capabilities, such as codecs may be done by nodes in the core networks such as a public switched network. Furthermore, the MS 28 in PLMN 30 may suitably be replaced by a network node either located in the fixed PSTN/ISDN network 16 or in the same PLMN 30. Thus such capability negotiation may take place between mobile stations in the same mobile network.

Second Embodiment

In accordance with a second embodiment of the present invention, using the telecommunication system of FIG. 1, there is shown a network element, hereinafter referred to as an originating mobile station 4 located in a first PLMN 2 which mobile station 4 is controlled by Base Station Controller or BSC 8. A Mobile Switching Centre (MSC) 10 directly controls or is linked to the BSC 8 and has an associated storage means in the form of a VLR 12. A GMSC 14 provides an interface between other networks such as a PSTN or ISDN 16. The GMSC 14 is directly linked to the MSC 10 and a further MSC 20 which has an associated VLR 22. Each of the VLRs store details of mobile subscribers and their mobile units that are temporarily located within the serving area of the associated MSC. A further storage means 18 in the form of a Home Location Register (HLR) provides permanent storage of subscriber details and keeps continuous track of the location of a subscriber whether that subscriber is in an MSC service area or in a different PLMN. This information is used by the GMSC 14 when receiving a call from another network.

When the mobile station 4 wishes to initiate a communication or a call with a mobile station, hereinafter referred to as a destination mobile station, MS 28 located in a further PLMN 30, a list of operating capabilities of originating MS 4 is already stored in the VLR 12 associated with the MSC 10 serving MS 4. The destination mobile station MS 28 is serviced by base station controller BSC 27 which in turn is linked to and controlled by MSC 29. Associated with the MSC 29 is a storage means in the form of a VLR 31 which stores a list of operating capabilities of MS 28. The MSC 29 is linked directly to a GMSC 32 which in turn is linked to a further network such as the PSTN/ISDN 16. A set-up message is transmitted from MS 4 to the MSC 10. Thereafter an Initial Address Message (IAM) is sent from the MSC 10 to the GMSC 32 which may traverse other nodes such as the GMSC 14 and the fixed network 16. Included in this message are the operating capabilities, including, for example, the list of codecs that the MS 4 can use. At this stage on receipt by the GMSC 32 of the IAM from MSC 10, the GMSC 32 will send an information retrieval message in the form of a routing information retrieval signal to the MSC 29/LVR 31 requesting identification of the destination mobile station by the MSISDN or IMSI, in which case the MSC 29/LVR 31 will respond by sending the Mobile Subscriber Roaming Number (MSRN). This is sent back to the GMSC 32 for call routing purposes and a list of supported operating capabilities of the MS 28 is returned to the GMSC 32. The GMSC 32 is then in a position to select a codec or other operating capabilities for use and compatibility between the originating MS 4 and the destination MS 28. A further Initial Address Message or (IAM) is sent from the GMSC 32 to the MSC 29 including the selected codec whereupon a call is set up between the destination MS 28 and the originating MS 4. The list of supported operating capabilities, including codecs, by MS 28 is initially obtained from the VLR 31 for use in the return routing information retrieval message from the MSC 29 to the GMSC 32.

The MSC 10 or equivalently a BICC node has capability to separate an ISDN user part (ISUP) signal into a Call Control (CC) portion and a Bearer Control (BC) portion to where the Call Control (CC) portion of the ISUP carries the initial address message IAM. By separating out the CC and BC portions via ISUP, the BC portion can allow the transmission at non-PCM levels particularly across the fixed network 16 which generally operates at 64 kbit/s. For example, channels only require 8 kbit/s or 16 kbit/s can be used so that when the MS 4 communicates with the MS 28, the selected codec may reflect the transmission at non-PCM levels such as 13 kbit/s for example.

Figure 3:
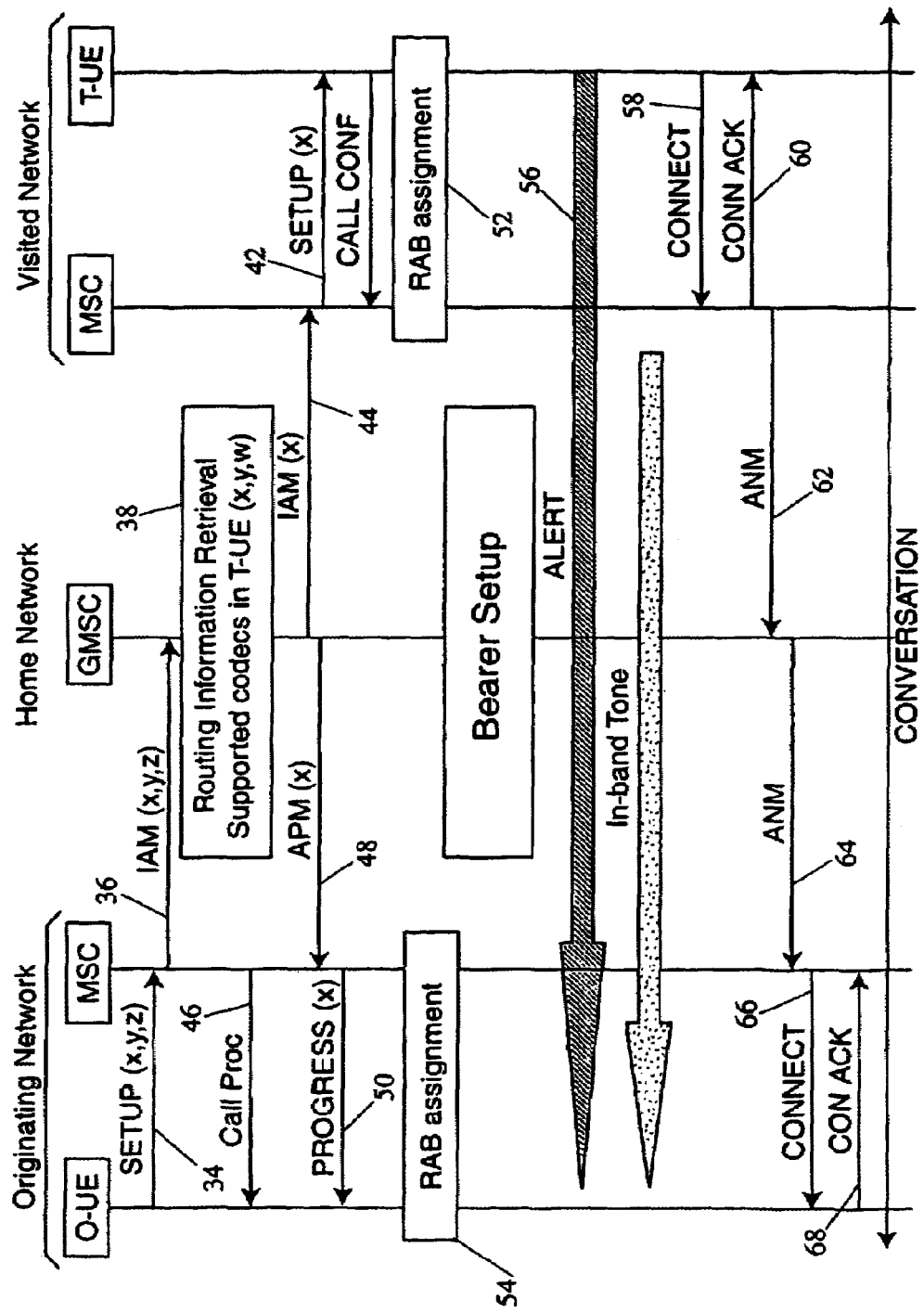
FIG. 3 is a signalling diagram showing signalling messages that are passed between an originating mobile station and a destination mobile station using the telecommunications system of FIG. 1 in accordance with a second embodiment of the present invention.

Referring to FIG. 3, MS 4 in the originating PLMN 2 sets up the call through the set-up signal 34 which is received by the MSC 10. From there the MSC 10 sends an IAM 36 with a list of the operating capabilities of the MS 4, which may for example contain a list of codecs X, Y, Z that the MS 4 may use. This is transmitted to the GMSC 32, which by way of example is transmitted over a core network 16. The GMSC 32 then sends the routing information retrieval message 38 to the MSC 29/LVR 31 and when that signal is received a signal is returned to the GMSC 32 including the list of supported codecs and other operating capabilities of MS 28. In this particular example these supported codecs are identified as X, Y and W. The GMSC 32 then selects an appropriate codec, in this example X, for use by both MS 4 and MS 28 and forwards an IAM 44 to the MSC 29 including the listed codec X and from there a set-up signal 42 is transmitted from the MSC 29 to the MS 28. At the same time the retrieval message 38 is being sent to the MSC 29, a call processing signal 46 is sent from the MSC 10 to the MS 4 so as to inform the MS 4 of progress of the call. A message 48, in the form of an application transport message (APM), containing the selected codec X is transmitted from GMSC 32 to the MSC 10 which in turn transmits a further progress call 50 to the MS 4 containing the selected codec X in this case. Radio Access Bearer (RAB) channels are then set up between the mobile stations and their respective MSCs at steps 52 and 54 respectively. An alert signal 56 is then sent from the destination MS 28 to the originating MS 4 as an in-band tone. On receipt of the alert message, the MS 4 responds by generating a ringing tone and if the subscriber of mobile station 28 answers, that MS sends a connect message at 58 to the MSC 29. The connection is then acknowledged by the MSC 29 in a return signal 60 to the MS 28 and then the MSC 29 forwards an answer message 62 to the GMSC 32 which is then forwarded at 64 on to the MSC 10. A connect message 66 is then transmitted from the MSC 10 to the MS unit 4 and connection is acknowledged by the MS 4 in a signal 68 back to the MSC 10. Thereafter conversation can then take place between the two mobile subscribers.

Figure 4:
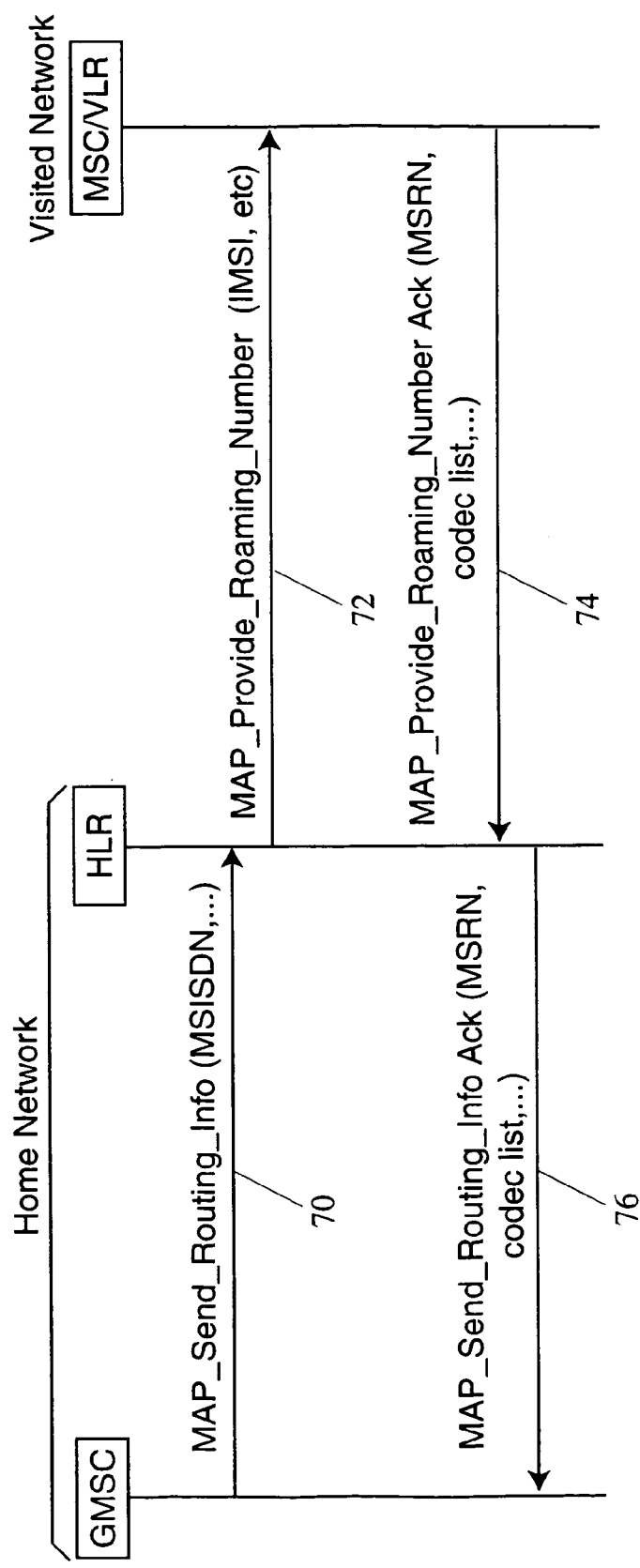
FIG. 4 is a signalling diagram of the second embodiment of the present invention, showing the messages signalled between a switching centre serving a destination mobile station and a telecommunications network node, being in this case a GMSC located in a home network of the destination mobile station.

With reference to FIG. 4 the routing information retrieval message is sent by the GMSC 32 to the Home Location Register (HLR) 33 as a signal 70. This signal is sent using the Mobile Application Part (MAP) protocol and contains information requesting the identity of the mobile subscriber 28, such as the MSISDN or IMSI, from the HLR 33. The HLR 33 then forwards on a signal 72 using MAP to the visited network, in this case MSC 29 and VLR 31 of the MS 28. The signal 72 includes the request for the MS 28 to provide a roaming number or IMSI (International Mobile Subscriber Identity). Once received by the MSC 29 it responds with a signal 74 containing an acknowledgement of the signal 72 and transmits the mobile subscriber roaming number applicable to the MS 28 together with a list of operating capabilities, including a list of codecs, to be used by the MS 28. This list is retrieved from the VLR 31. That gets transmitted to the HLR 33 which in turn forwards a signal 76 to the GMSC 32 containing the routing information acknowledgement and the MSRN and the list of operating capabilities of the mobile station 28.

It will be appreciated that the list of operating capabilities included in the IAM 36 may be incorporated in the MAP message 70 sent from the GMSC 32 to the HLR 33, and then in the MAP message 72 from the HLR 33 to the MSC 29/LVR 31. The selected operating capability may then be returned to the GMSC 32 from the MSC 29/VLR 31 via MAP messages 74 and 76. In this case, codec selection takes place in the MSC 29/LVR 31.

Although this particular embodiment has been described with respect to a GSM network, the invention equally applies to third generation PLMN networks and other second generation PLMN networks, having similar architectures. Furthermore the telecommunications network node in this preferred embodiment has been identified as GMSC 32. It may equally be a further GMSC in the network identified as the home network of the destination mobile station MS 28. Alternatively it may be any other node in either a PLMN or a node located in the fixed network 16. Furthermore the call may not necessarily be established across a fixed network 16 but may be from one mobile network to another mobile network or the originating mobile station and destination mobile station may be located within the same PLMN.

With the foregoing description in mind, it is to be appreciated that the speed and efficiency at which operating capabilities, such as codecs and security algorithms, may be substantially accelerated from mobile terminated calls where a list of operating capabilities of the mobile station are stored at a selected telecommunications node such that the requirement for negotiating operating capabilities out of band towards the terminating mobile station is substantially reduced or not needed at all. Furthermore the GMSC serving the originating mobile station may have forwarded to it a list of operating capabilities of the originating mobile station or network element which is sent from the designated VLR associated with the originating mobile station or network element.

It will also be appreciated that various modifications and alterations may be made to the preferred embodiments above, without departing from the scope and spirit of the present invention.

We claim:

1. A method of negotiating operating capabilities in a telecommunications system including at least one mobile station, the method comprising:
   receiving a first list of operating capabilities of a first mobile station at a first node upstream of and associated with the first mobile station wherein the list includes codecs supported by the first mobile station and is received prior to setting up a call with the first mobile station;
   storing the operating capabilities of the first mobile station at the first node;
   receiving a second list of operating capabilities of a second mobile station at a second node upstream of and associated with the second mobile station wherein the list includes codecs supported by the second mobile station and is received prior to setting up the call with the second mobile station;
   storing the operating capabilities of the second mobile station at the second node; and
   selecting agreed upon operating capabilities by comparing the second list to the first list, thereby negotiating the operating capabilities between the first node and the second node.

2. The method as claimed in claim 1, wherein the step of receiving the first list of operating capabilities includes receiving the first list of operating capabilities from the first mobile station via a location update message.

3. The method as claimed in claim 1, wherein the step of selecting agreed upon operating capabilities includes selecting the agreed-upon operating capabilities based on operating capabilities that are in common on both lists.

4. The method as claimed in claim 1, wherein the first and second nodes are selected from a group consisting of:
   a Mobile Switching Center (MSC);
   a Visitor Location Register (VLR);
   a Home Location Register (HLR); and
   a Gateway Mobile Switching Center (GMSC).

5. A method of negotiating operating capabilities in a telecommunications system including at least one mobile station, the method comprising:
   receiving a first list of operating capabilities of a first mobile station at a first node upstream of and associated with the first mobile station wherein the list includes security algorithms supported by the first mobile station and is received prior to setting up a call with the first mobile station;
   storing the operating capabilities of the first mobile station at the first node;
   receiving a second list of operating capabilities of a second mobile station at a second node upstream of and associated with the second mobile station wherein the list includes security algorithms supported by the second mobile station and is received prior to setting up the call with the second mobile station;
   storing the operating capabilities of the second mobile station at the second node; and
   selecting agreed upon operating capabilities by comparing the second list to the first list, thereby negotiating the operating capabilities between the first node and the second node.

6. A method in a first switch node for communicating device operating capabilities between a first mobile station and a second mobile station, wherein the first mobile station is served by the first switch node, wherein the first switch node is associated with a storage means, the method comprising:
   receiving data indicating the device operating capabilities associated with the first mobile station, wherein the data includes codecs supported by the first mobile station and is communicated without establishing a call connection between the first mobile station and the first switch node;
   storing the communicated data within the storage means;
   receiving a call setup message from the first mobile station to establish an outgoing call connection towards the second mobile station;
   retrieving the stored data within the storage means; and
   sending an outgoing call setup message to a second switch node serving the second mobile station, wherein the retrieved data are included within the outgoing call setup message to allow the data to be reviewed by the second switch node for device compatibility with the second mobile station so that negotiation of operating capabilities takes place between the first switch node and the second switch node.

7. The method of claim 6 wherein the storing is performed by a Visitor Location Register (VLR).

8. The method of claim 6 wherein the reviewing by the second switch is performed by a Gateway Mobile Switching Center (GMSC) serving the second mobile station.

9. The method of claim 6 wherein the reviewing by the second switch is performed by a Mobile Switching Center (MSC) serving the second mobile station.

10. The method of claim 6 wherein the step of receiving data indicating the device operating capabilities of the first mobile station includes receiving the data from the first mobile station during a location update procedure.

11. The method of claim 6 wherein the outgoing call setup message is an Initial Address Message.

12. A communications node, comprising:
   means for receiving data from a first mobile station, wherein the data indicates device operating capabilities associated with the first mobile station, wherein the data includes codecs supported by the first mobile station and is communicated without establishing a call connection between the first mobile station and the communications node;
   means for storing the communicated data;
   means for receiving a call setup message from the first mobile station to establish an outgoing call connection towards a second mobile station;
   means for retrieving the stored data; and
   means for including the retrieved data within an outgoing call setup message to allow the data to be reviewed by a switch node serving the second mobile station for device compatibility with the second mobile station so that negotiation of operating capabilities take place between the communications node and the switch node serving the second mobile station.

13. The communications node of claim 12 wherein the means for storing is a Visitor Location Register (VLR).

14. The communications node of claim 12 wherein the switch node serving the second mobile station is a Gateway Mobile Switching Center (GMSC).

15. The communications node of claim 12 wherein the switch node serving the second mobile station is a Mobile Switching Center (MSC).

16. The communications node of claim 12 wherein the means for receiving data from the first mobile station includes means for receiving the data during a location update procedure.

17. The communications node of claim 12 wherein the outgoing call setup message is an Initial Address Message.

\* \* \* \* \*